July 24, 1962
J. P. MANLEY ETAL
3,045,660
PICNIC GRILL
Filed Aug. 19, 1959
2 Sheets-Sheet 1
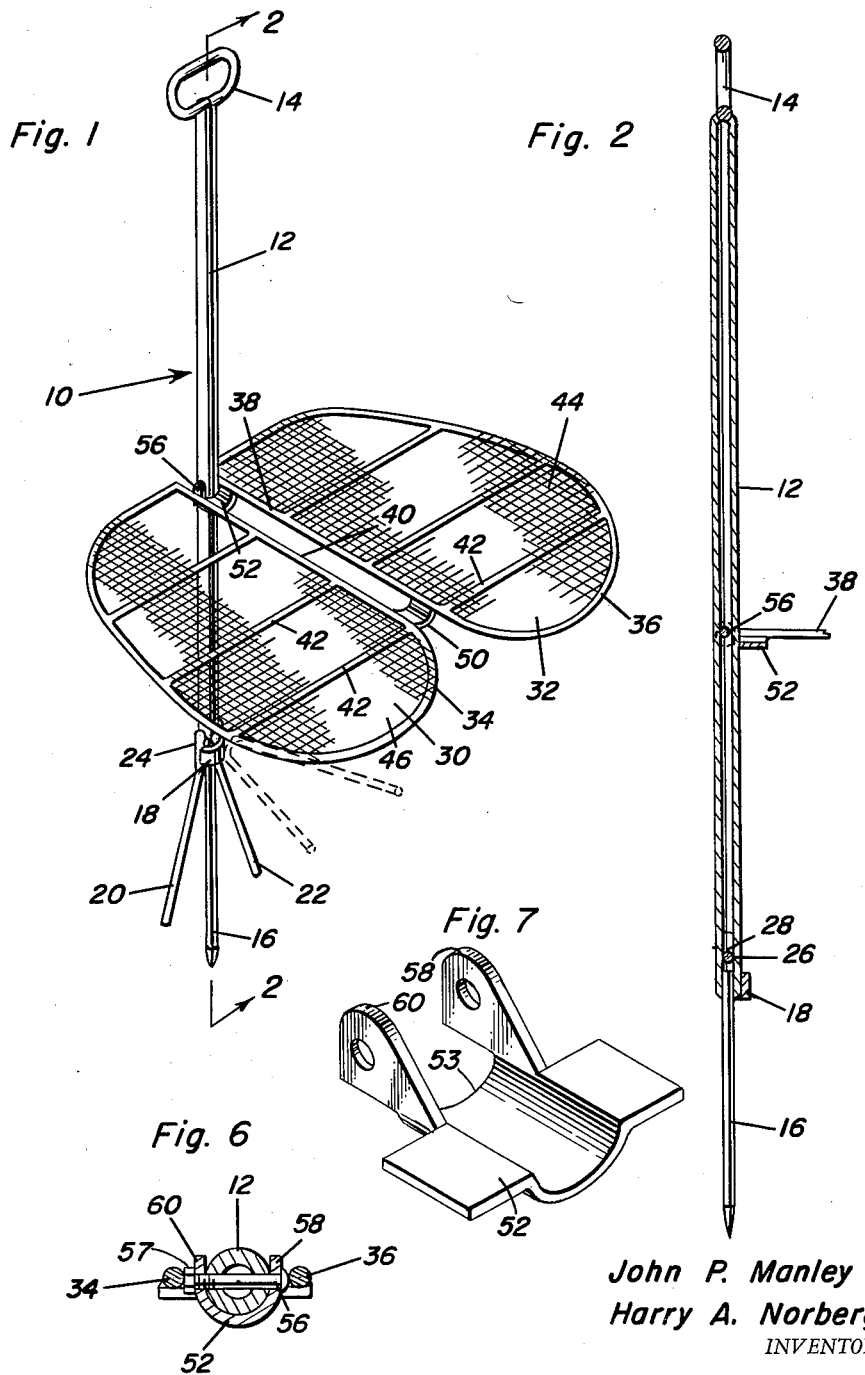
John P. Manley
Harry A. Norberg
INVENTORS
BY Clarence A. O'Brien
and Harvey B. Jacobson
Attorneys July 24, 1962  J. P. MANLEY ETAL  3,045,660
PICNIC GRILL Filed Aug. 19, 1959  2 Sheets-Sheet 2

John P. Manley
Harry A. Norberg
INVENTORS

BY Clarence A. O'Brien
and Harvey B. Jacobson
Attorneys

United States Patent Office 3,045,660
Patented July 24, 1962

3,045,660
PICNIC GRILL
John P. Manley, P.O. Box 310, and Harry A. Norberg, Box 536, both of Marble Falls, Tex.
Filed Aug. 19, 1959, Ser. No. 834,877
1 Claim. (Cl. 126—30)

This invention relates to portable picnic grills and more particularly to a portable, foldable picnic grill.

An object of the invention is to provide an easily used, sturdy and substantial picnic grill which is capable of being folded to a compact position to facilitate storage and transportation.

Briefly, a picnic grill in accordance with the invention includes an upright or post with means at the lower end by which to engage the ground and hold the post in a steady erect position. There are perforated grill members connected to the post in such a way that they are capable of being retained closely adjacent to the post and selectively, moved to a substantially horizontal position when the post is maintained vertical. The grill members, when in the horizontal position, may then be used as any other grill member to support articles of food or food containers in accordance with the desires and judgment of the user.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the picnic grill in the open position.

FIGURE 2 is a sectional view taken on the line 2—2 of FIGURE 1.

FIGURE 6 is a fragmentary sectional view on enlarged scale and taken on the line 6—6 of FIGURE 3.

FIGURE 7 is a perspective view of a detail.

Figure 3:
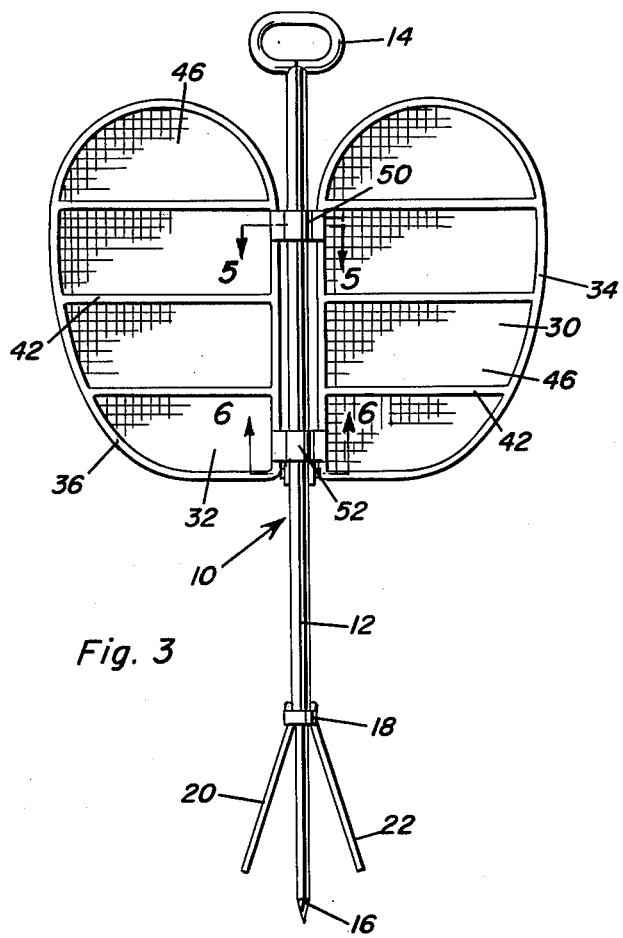
FIGURE 3 is a front elevational view of the picnic grill.
Figure 4:
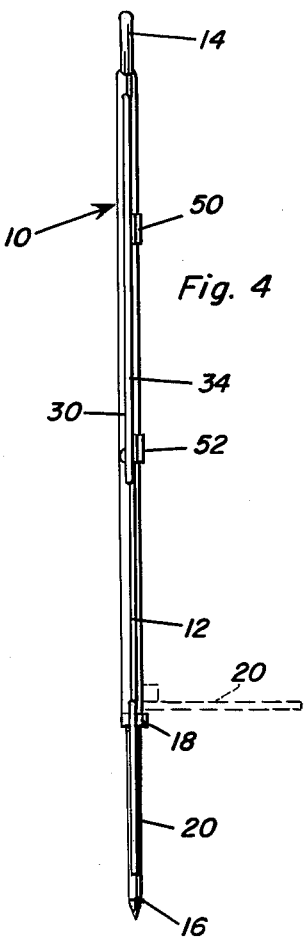
FIGURE 4 is a side view of the picnic grill in FIGURE 3.
Figure 5:
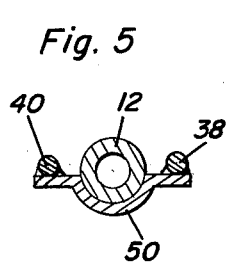
FIGURE 5 is a sectional view taken on the line 5—5 of FIGURE 3 and on enlarged scale.

In the accompanying drawings there is shown a portable, foldable picnic grill 10 which exemplifies the principles of the invention. The grill is made of an upright post 12, preferably of hollow tubing or the like, and has a carrying handle 14 at one end thereof. The carrying handle is preferably made of an oval shaped member which is welded or otherwise fastened to the upper end of the post. The lower end of the post has ground engaging devices connected therewith. These ground engaging devices enable the picnic grill to be held in an erect, steady position and includes a pin 16 fixed to the lower extremity of post 12 and as a longitudinal extension thereof. Although not essential, it is preferred that the pin be fitted into the bore of the post and welded or otherwise fastened in place. Collar 18 is pivotally fixed to the lower end of the post and it has a stop function when used in coordination with arms 20 and 22. Although only two arms are illustrated it is to be clearly understood that this number may be increased or decreased. The arms each have an angulated upper end 24 secured to the collar 18 together with a laterally projecting pin 26 which enters an aperture 28 in the lower part of post 12. The arms 20 and 22 can be pivotally swung to an up position as shown in dotted lines in FIGURES 1 and 4 at which position the collar functions as a stop. Further, the arms 20 and 22 may be used as stabilizers by laying flat upon the ground when the pin 16 is fully inserted in the ground as shown in dotted lines in FIGURE 4.

There are two coplanar grill members 30 and 32, each consisting of its frame 34 and 36 made of rods, bar stock or the like and in a shape providing adjacent straight sides 38 and 40 together with outer sides which are artistically curved. Transverse rods 42 extend across the outer frames 34 and 36 and are fixed in place for rigidity and strength. Hardware cloth or other perforated non-burnable panels 44 and 46 are fixed to the frames and to the braces 42 to provide a surface on which to support articles of food, food containers, etc.

Arcuate brackets 50 and 52 are fixed at their ends to the straight parallel sides 38 and 40 of the frames. These arcuate brackets maintain the grill members 30 and 32 in a fixed position with reference to each other. They also function as saddles embracing portions of the post 12 when the grill members are moved to a position at which they are essentially coplanar and parallel (FIGURE 4) to the post 12.

A pivot pin or stud 56 extends through bores in a pair of ears 58 and 60 at one end of bracket 52 and also extends through apertures in post 12. The pin 56 establishes an axis of rotation for the grill members, coupling them to the post so that the grill members can be pivotally moved between positions shown in FIGURES 1 and 4 respectively. The pin or stud 56 has a nut 57 threaded on one end. When in the horizontal position (FIGURE 1) one edge 53 of bracket 52 abuts a portion of the surface of post 12 whereby the bracket 52 cooperating with a portion of the post constitutes a stop to limit the pivotal movement of the grill members in one direction.

In use and operation, the portable grill is easily carried without having the grill members project laterally outwardly from the post. When a site is selected for using the grill, the arms 20 and 22 are pivoted to a horizontal position about pin 26 as shown in dotted lines in FIGURE 4, cooperating with pin 16 which pierces the ground, to hold the grill steady with its post 12 in an erect position. Grill members 30 and 32 are then pivotally moved to a horizontal position at which bracket 52 engages a portion of post 12 and thereby functions as a stop to hold the grill members horizontal.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A portable, foldable grill comprising a rigid elongated post including handle means provided at one of its ends, a grill unit comprising two individual flat and coplanar grill members each having a straight adjacent inner side, the sides being disposed in spaced parallel relationship, a pair of substantially U-shaped brackets bridging the space between and secured at longitudinally spaced points to said sides so as to rigidly secure them together, journal means on said sides adjacent one of said brackets and embracing said post, a pivot pin extending through said post and journal means, said pivot pin being normal to the longitudinal axis of the post and coplanar with said grill unit, an edge of said one bracket being engageable with said post to support said grill in a horizontal position when said post is vertical, said grill unit being swingable toward said handle means on said pivot pin to a position wherein the post extends between said sides and is coplanar with said grill unit, arm means pivotally connected to said post between said grill unit and the other end of the post on an axis parallel to said pin, said arm means being pivotable on its pivot axis toward said grill unit from a position coplanar with said post to a position normal thereto, stop means on said arm means for engaging said post and positively stopping movement of said arm means towards said grill unit when said arm means is pivoted from a position coplanar with said post to a position normal to said longitudinal axis, the other end of the post adapted to be inserted in the earth with said arm means resting on the earth's surface below said grill unit when the grill is in operative position whereby the arm means prevents tilting of the grill relative to the earth.

References Cited in the file of this patent

UNITED STATES PATENTS

| | | | |
|---|---|---|---|
| D. 182,762 | Forrest | May 13, | 1958 |
| 1,173,036 | Robidoux | Feb. 22, | 1916 |
| 1,234,159 | Hannum | July 24, | 1917 |
| 1,326,059 | Humphrey | Dec. 23, | 1919 |
| 2,347,443 | Veseley | Apr. 25, | 1944 |
| 2,905,418 | Escartin | Sept. 22, | 1959 |
| 2,974,662 | Forrest | Mar. 14, | 1961 |

FOREIGN PATENTS

| | | |
|---|---|---|
| 1,311 | Great Britain | 1861 |